United States Patent [19]

Lueders

[11] Patent Number: 4,513,933
[45] Date of Patent: Apr. 30, 1985

[54] TRANSDUCER CLAMPING DEVICE

[75] Inventor: Willi H. Lueders, Sandusky, Ohio

[73] Assignee: General Motors Corporation, Detroit, Mich.

[21] Appl. No.: 505,178

[22] Filed: Jun. 17, 1983

[51] Int. Cl.³ .............................................. G12B 5/00
[52] U.S. Cl. .................................. 248/27.1; 248/274; 248/297.5; 403/374
[58] Field of Search ................. 248/410, 539, 27.1, 248/DIG. 4, 274, 178, 179, 297.5; 403/374, 373, 409

[56] References Cited

U.S. PATENT DOCUMENTS

| | | | |
|---|---|---|---|
| 602,662 | 4/1898 | Miller | 248/539 |
| 2,397,749 | 4/1946 | Mendelson | 248/410 |
| 2,637,313 | 5/1953 | White | 248/410 |
| 2,844,993 | 7/1958 | Soderquist | 248/274 |
| 3,362,668 | 1/1968 | Reinhart | 248/410 |
| 4,448,385 | 5/1984 | Matthys | 248/274 |

Primary Examiner—Reinaldo P. Machado
Assistant Examiner—Alvin Chin-Shue
Attorney, Agent, or Firm—Patrick M. Griffin

[57] ABSTRACT

A clamping device for removably attaching a transducer of the probe type to a gage comprises a block having a first end attached to the body of the gage and a second end spaced slightly therefrom, with a tunnel between the two ends aligned with a matching tunnel through the gage body. The gage body tunnel closely surrounds the tubular stem of the gage, while the block tunnel is slightly radially spaced therefrom. A clamping bolt draws the second end down into engagement with the gage body, which creates an axial misalignment of the tunnels to bring the block tunnel wall into clamping engagement with the probe, the misalignment and clamping force controlled by the spacing of the second end.

1 Claim, 4 Drawing Figures

TRANSDUCER CLAMPING DEVICE

This invention relates to a clamping device designed for releasably mounting and fixedly positioning a transducer probe to the body of a flow-through gage.

BACKGROUND OF THE INVENTION

Modern assembly lines often have a flow-through gage located along the conveyor belt which includes a series of transducer probes to measure and monitor critical dimensions of parts flowing therethrough. Such measuring probes must be held securely and removably for servicing, changing the position, etc. Current clamping devices which hold the probe to the body of a flow-through gage have certain drawbacks as far as control of the pressure with which the probe is held, as well as in the quick removal and changing of a probe.

SUMMARY OF THE INVENTION

The clamping device of the invention solves the problems of the prior art by providing a clamping device in which the pressure is easily controlled and in which the probe may be quickly and easily removed. The embodiment disclosed includes a block shaped portion of metal, with a central tunnel therethrough and with one end comprising a flat base engageable with a flat portion of the body portion of the flow-through gage. The central axial tunnel is aligned with a longer tunnel through the gage body through which the tubular stem of a transducer probe may be inserted. The central tunnel is of a diameter slightly larger than the diameter of the transducer stem while the gage body tunnel has a diameter closely matching the stem diameter. The flat base of the block is held to the body of the gage by any suitable means, such as a threaded bolt.

The bottom of the block adjacent the flat base is machined to create a stepped portion spaced from the surface of gage body by a predetermined amount. The block also has a slot cut thereinto adjacent the juncture of the base and the stepped portion to create a weakened area which acts as a live hinge. The end of the block opposite the attached base has a hole therethrough and a threaded tightening bolt of a diameter slightly less than the diameter of the hole it passes through and the bolt is threaded into the gage body, with its head bearing on the top of the block. When the transducer probe stem is inserted through the central tunnel of the block and through the aligned gage body tunnel, it is closely held by the gage body tunnel, but more loosely held in the block tunnel and initially coaxial therewith. Turning down the tightening bolt causes the block to deform about the slot until the one end is engaged with the body of the gage. This causes a predetermined axial shifting or tilting of the block tunnel relative to the closely confined stem, which in turn causes an engagement therewith to hold it fast. The degree of this shifting is controlled by the offset surface block contacting the gage body, so overtightening is avoided, and because of the fact that the orientation of the tightening bolt is the same as the attaching bolt, access thereto is assured and the probe may be easily removed.

It is, therefore, an object of the invention to provide a clamp for transducer probe in which the holding or clamping pressure may be easily controlled.

It is another object of the invention to provide such a clamping device in which the probe may be easily inserted and removed.

It is yet another object of the invention to provide a clamp in which the holding pressure is limited and controlled by providing a clamping block with a probe holding tunnel between an attached end and an offset tightening end which engages a surface of the gage body to create a controlled axial misalignment of the tunnel to grip the probe.

BRIEF DESCRIPTION OF THE DRAWINGS

These and other objects of the invention will be apparent from the following written description and drawings in which.

DESCRIPTION OF THE PRIOR ART AND THE PREFERRED EMBODIMENT PRIOR ART

Figure 1:
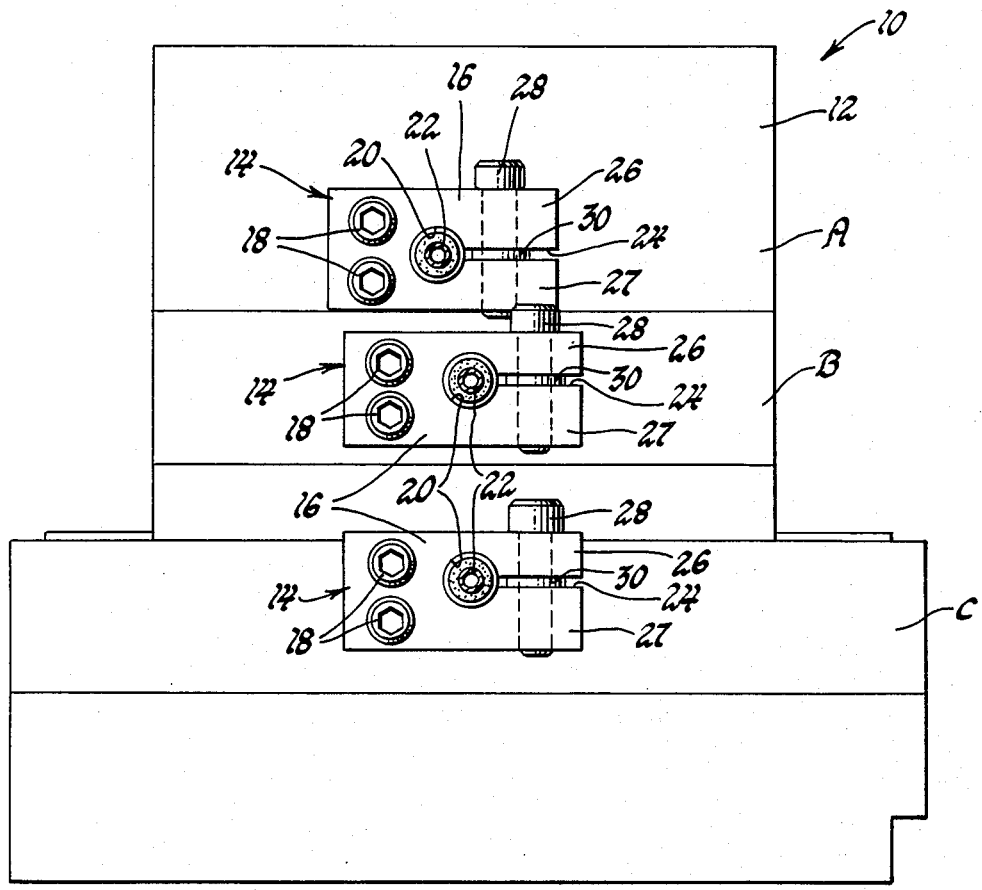
FIG. 1 is a side view of a flow-through gage with several of the prior art transducer clamps shown.

Referring first to FIG. 1, a flow-through gage designated generally at 10 has a body 12 which often has several levels, designated generally as A, B and C. Although not apparent from FIG. 1, these different levels may in fact overhang one another, depending upon the dimensions of the part which flows through on the other side of the gage. Three of the prior art transducer clamps designated generally at 14 are shown attached to the various levels of the body portion 12. Each prior art clamp consists of a generally rectangular block 16 attached by bolts 18 to a flat surface of some level of the body 12 and having a central tunnel 20 therethrough receiving the tubular stem of a transducer probe, designated generally at 22. A slot 24 is cut through one end of block 16 opening to tunnel 20 to create two separate and opposed fingers 26 and 27. A tightening bolt 28 is threaded through the fingers, running in a direction generally perpendicular to the tubular stem of probe 22 and bolts 18 and through a spacing washer 30 between fingers 26 and 27. Probe 22 is held by the closing or tightening of the inside wall of tunnel 20 which occurs when tightening bolt 28 is turned, bringing fingers 26 and 27 closer together and tending to close up slot 24, a closing which is limited by the spacing washer 30. This creates a radial force holding the stem of probe 22. Problems with this construction are that the head of tightening bolt 28 may be blocked by the overhang of an adjacent level of the gage body 12. In addition, it may be seen that overtightening of the fingers 26 and 27 may occur due to resiliency or flattening of the spacing washer 30, causing damage to probe 22.

PREFERRED EMBODIMENT

Figure 2:
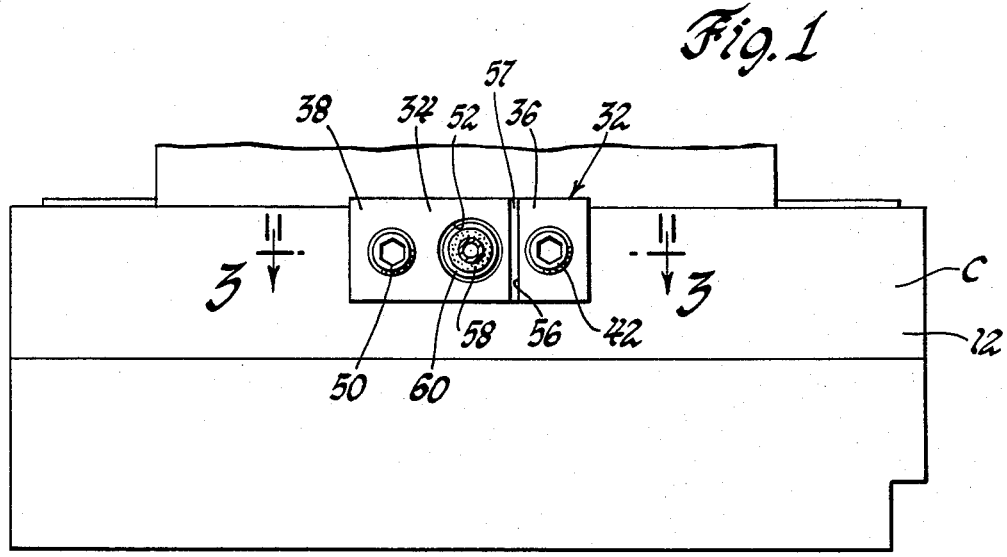
FIG. 2 is a partial view similar to FIG. 1 but showing the clamp of the invention.

Referring now to FIG. 2, the transducer clamp of the invention, designated generally at 32, is shown attached to one level of the body 12. Clamp 32 includes a generally rectangular block 34, formed of metal in this embodiment, and has an attachment end 36 and a tightening end 38. Block 34 is thus of a similar size and shape to block 16 of the prior art, but with differences and advantages which will be described below.

Figure 3:
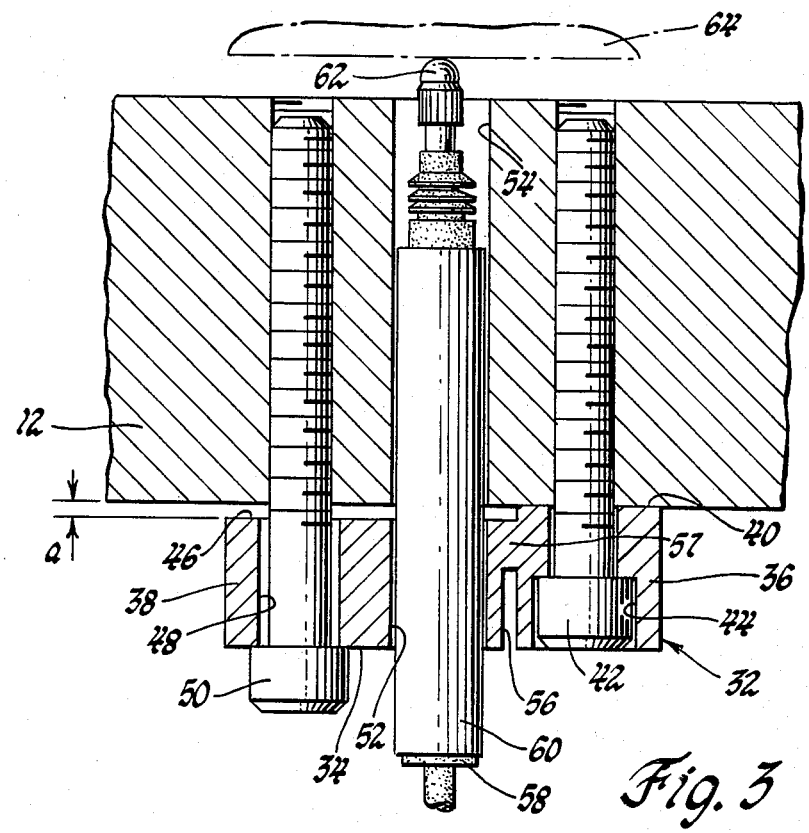
FIG. 3 is a view taken along the line 3—3 of FIG. 2 and showing the clamping device loosened.

Referring next to FIG. 3, it may be seen that attachment end 36 includes a flat base 40 which is held against body 12 by an attachment bolt 42, the shaft of which is threaded into body portion 12 and the head of which is inset into stepped hole 44 through attachment end 36. Attachment bolt 42 is essentially the same as attachment bolts 18 of the prior art. The remainder of the bottom of block 34 is machined or cut down to create an offset surface 46 which is normally spaced from the surface of body 12 by an amount designated "a" in FIG. 3. The purpose of this offset will be described below. The tightening end 38 of block 34 has a clearance hole 48 therethrough which has a diameter sufficient to clear a tightening bolt 50 which passes therethrough, its head resting on the top of block 34 and the shaft threaded into body 12 similarly to attachment bolt 42. The clearance prevents binding when bolt 50 is turned down. A central tunnel 52 passes through the center of block 34 approximately midway between the two ends 36 and 38 and is matched with a longer tunnel 54 of a diameter described below passing entirely through the body 12. Finally, a slot 56 is cut through the top of block 34 creating a strategically weakened portion therein at 57 for purposes to be described below.

A transducer of the probe type designated generally at 58 has a tubular stem 60 which extends through the aligned tunnels 52 and 54, the diameters of which are such that stem 60 closely contacts the wall of tunnel 54 with a slip fit but is slightly spaced from the wall of tunnel 52. Probe point 62 extends beyond body 12 where it may engage a workpiece to be measured, designated generally at 64 and shown in dotted lines. The position of point 62 would be set by any suitable means, such as a master part, or by some sort of stop member, not shown, in tunnel 54 contacting the end of stem 60. After setting, it is desirable to releasably and securely hold the probe 58 in position.

Figure 4:
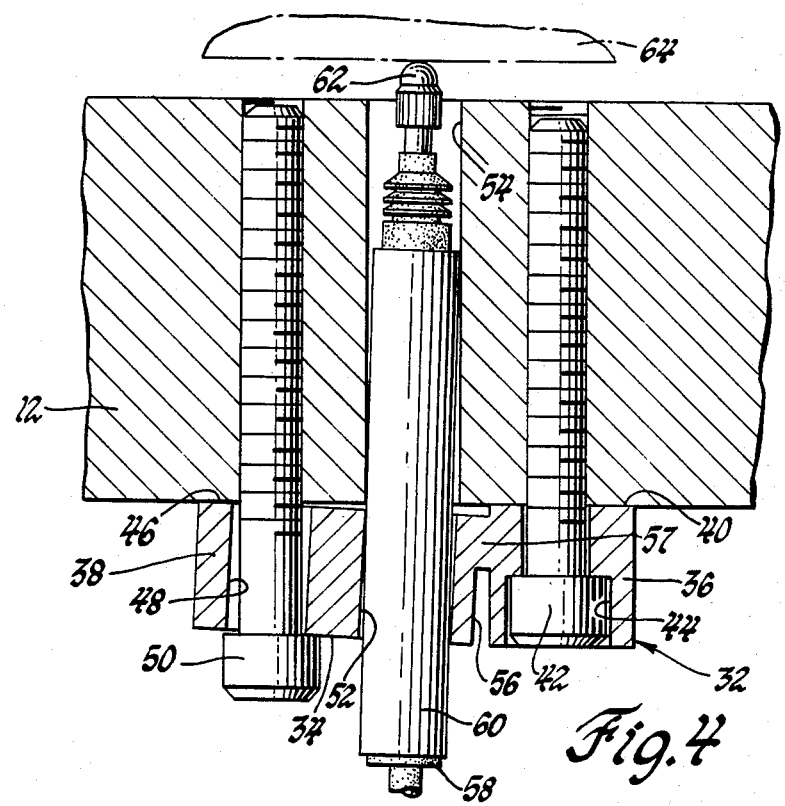
FIG. 4 is a view similar to FIG. 3 but showing the clamping device of the invention tightened.

Referring to FIG. 4, tightening bolt 50 has been tightened down after setting probe 58 in place, a tightening which has caused that part of offset surface 46 nearest to tightening end 38 to engage the surface of body 12 as block 34 bends about weakened portion 57. This has also caused tunnel 52 to become axially misaligned slightly relative to the closely confined probe stem 60 and has consequently caused the wall of tunnel 52 to engage stem 60 at two areas at opposite tunnel ends as seen in the drawing. The amount of this axial misalignment, and consequently the pressure holding probe 58, will depend upon the spacing "a" of FIG. 3 and the distance of tightening end 38 from tunnel 52, a larger spacing "a" or shorter distance both creating greater misalignment and greater pressure. Whatever the force of holding, it will be absolutely controlled by the engagement of surface 46 with body 12 and over-tightening will be controlled. In addition, since tightening bolt 50 runs in the same direction as probe 58 and attachment bolt 42, access for removal will not be a problem. Stem 60 will also shift very slightly within aligned tunnel 54, as seen in FIG. 4, an amount which has been exaggerated in the drawing.

A possible variation of the design, not shown in the drawings, would be to make offset surface 46 an inclined ramp, rather than a flat surface, with the spacing "a" remaining the same but tapering back to weakened portion 57. This would create the same tightening effect. In addition, rather than weakening block 34 with a slot 56, the top of block 34 from slot 56 to tightening end 38 could be machined off to the depth of slot 56. This would create the same strategically weakened portion 57, although the length of tunnel 52 and hole 48 would obviously be shorter. Tightening bolt 50 could, if desired, simply have a head which overhangs end 38, rather than passing through block 34. All that is necessary is a means for drawing end 38 down.

The embodiments of the invention in which an exclusive property of privilege is claimed are defined as follows:

1. A clamping device adapted for use with a flow-through gage or the like to releasably mount and fixedly position a transducer probe having a tubular stem relative to the body of said flow-through gage or the like, comprising:

a block member having a first end rigidly attached to a surface of the gage body and a second end normally spaced from the surface of the gage body by a predetermined amount, the block member further including a tunnel therethrough between the first and second ends normally axially aligned with a tunnel through the gage body, the wall of the gage body tunnel closely confining the tubular stem of the transducer probe, and the wall of the block tunnel being normally radially spaced from the tubular stem by a predetermined amount, the block member also including a weakened portion between the block tunnel and the rigidly attached first end, and tightening means in one mode engaging the second end with the gage body surface from which it is normally spaced by deforming the block member about the weakened portion causing a controlled axial misalignment of the block member tunnel relative to the tubular stem sufficient to bring the wall of the block member tunnel into clamping engagement therewith to fixedly position the probe relative to the gage body with the pressure holding said probe being absolutely controlled and predetermined by the engagement of the normally spaced second end with the gage body surface, the tightening means in another mode restoring the normal spacing of the second end from the gage body surface and the normal axial alignment of the tunnels to release the probe from the gage body.

* * * * *